(12) United States Patent
Batenin

(10) Patent No.: US 7,962,959 B1
(45) Date of Patent: Jun. 14, 2011

(54) COMPUTER RESOURCE OPTIMIZATION DURING MALWARE DETECTION USING ANTIVIRUS CACHE

(75) Inventor: Vyacheslav A. Batenin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 12/958,232

(22) Filed: Dec. 1, 2010

(51) Int. Cl.
*G06F 11/00* (2006.01)
*G06F 12/14* (2006.01)
*G06F 12/16* (2006.01)
*G08B 23/00* (2006.01)

(52) U.S. Cl. ............ 726/24; 713/188; 713/189; 726/25; 711/133

(58) Field of Classification Search ............ 726/22, 726/23, 24, 25; 713/188, 189; 711/113, 711/133, 118, 135, 144
See application file for complete search history.

(56) References Cited

U.S. PATENT DOCUMENTS

| | | | |
|---|---|---|---|
| 5,535,360 A * | 7/1996 | Cassetti | 711/140 |
| 5,854,916 A * | 12/1998 | Nachenberg | 703/21 |
| 5,999,723 A * | 12/1999 | Nachenberg | 703/22 |
| 6,021,510 A * | 2/2000 | Nachenberg | 714/38 |
| 6,748,534 B1 | 6/2004 | Gryaznov et al. | |
| 6,820,085 B2 | 11/2004 | Nishizawa et al. | |
| 7,080,000 B1 * | 7/2006 | Cambridge | 703/21 |
| 7,185,003 B2 | 2/2007 | Bayliss et al. | |
| 7,222,117 B1 | 5/2007 | McGrogan | |
| 7,421,562 B2 | 9/2008 | Bhatt et al. | |
| 7,441,254 B1 | 10/2008 | Holland et al. | |
| 7,461,373 B2 | 12/2008 | Herle et al. | |
| 7,559,086 B2 * | 7/2009 | Sobko et al. | 726/24 |
| 7,591,019 B1 * | 9/2009 | Sobko et al. | 726/24 |
| 7,765,400 B2 * | 7/2010 | Costea et al. | 713/165 |
| 7,765,410 B2 * | 7/2010 | Costea et al. | 713/188 |
| 7,882,561 B2 * | 2/2011 | Costea et al. | 726/24 |
| 2003/0187957 A1 | 10/2003 | Huang et al. | |
| 2004/0103199 A1 | 5/2004 | Chao et al. | |
| 2004/0117461 A1 | 6/2004 | Nakayama et al. | |
| 2006/0101282 A1 | 5/2006 | Costea et al. | |
| 2006/0130037 A1 | 6/2006 | Mackay | |
| 2006/0174344 A1 * | 8/2006 | Costea et al. | 726/24 |
| 2006/0179217 A1 * | 8/2006 | Ito et al. | 711/112 |
| 2006/0224724 A1 * | 10/2006 | Marinescu et al. | 709/224 |
| 2006/0259674 A1 | 11/2006 | Dunstan et al. | |
| 2006/0288416 A1 * | 12/2006 | Costea et al. | 726/24 |
| 2007/0016953 A1 * | 1/2007 | Morris et al. | 726/24 |
| 2007/0277167 A1 | 11/2007 | Smith et al. | |
| 2008/0148403 A1 | 6/2008 | Manion et al. | |
| 2009/0013409 A1 * | 1/2009 | Wenzinger et al. | 726/24 |

FOREIGN PATENT DOCUMENTS

EP 1655682 5/2006

* cited by examiner

*Primary Examiner* — David Garcia Cervetti
(74) *Attorney, Agent, or Firm* — Arent Fox LLP; Michael Fainberg

(57) ABSTRACT

Disclosed are systems, methods and computer program products for optimizing system memory utilization during execution of an antivirus application. The system provides an antivirus cache in a non-volatile system memory that may be updated with information from an antivirus database. Each update contains different types of data and executable code associated with different types of known malware. During update, the same types of data for each type of malware is collected and stored as data files in corresponding sections of the antivirus cache and executable code sections are converted into platform-specific dynamic libraries and also stored in the antivirus cache. During execution of the antivirus application, the system maps one or more data files of the antivirus cache into the physical memory, so that the memory-mapped data files and dynamic libraries of the antivirus cache may be shared and simultaneously accessed by several malware detection processes.

18 Claims, 5 Drawing Sheets

COMPUTER RESOURCE OPTIMIZATION DURING MALWARE DETECTION USING ANTIVIRUS CACHE

CROSS-REFERENCE TO RELATED APPLICATION

This application claims benefit of priority under 35 U.S.C. 119(a) to a Russian patent application no. 2010144584 filed on Nov. 1, 2010, which is incorporated by reference herein.

TECHNICAL FIELD

This disclosure relates generally to the field of computer malware detection and, in particular, to systems, methods and computer program products for computer memory optimization during computer malware detection using antivirus cache.

BACKGROUND

Generally, antivirus databases contain information necessary for the operation of antivirus software, which detects and removes viruses, warms, Trojans, spyware and other types of malware from computers and computer networks. The information stored in antivirus databases may include virus definitions, interpretable pseudocode and executable code for analyzing data objects using virus definitions and removing or disabling detected malware. Due to proliferation of new kinds of malware, antivirus database must be regularly updated with new virus definitions and other information to counter newly emerging threats.

Since antivirus databases are generally quite large (e.g., tens of megabytes), a full update by downloading the entire new version of the database on the user's computer may be impractical. An incremental updating of databases is preferred. In this method, the antivirus application downloads only update files and combines them with the previously downloaded content. Each update file usually contains different types of information associated with a new type of malware. This format of updates is convenient for modifying the database, but typically cannot be directly used by the antivirus application and may require conversion.

More specifically, during an antivirus database update, new files are added and one or more old files are replaced by the new content. During malware scan of the computer system, antivirus application generally loads the antivirus database into computer's RAM, reads database files into the system memory in succession and converts the data structure into an internal format that is convenient for program operation. This format conversion typically takes place in computer's RAM during antivirus program execution. This method is typically used because of the simplicity of maintaining the database, since individual database files may be easily modified independently during execution of the antivirus application.

However, there are several drawbacks of the existing database update techniques. For example, each time the antivirus engine is started, the antivirus database is loaded into the computer's RAM and data format conversion is performed. This process consumes significant system resources when loading antivirus application and may slow down booting of the operating system (OS) because antivirus application is typically started as a system service during OS startup. Another drawback is the inefficient use of memory when an antivirus database is used by several malware scanning processes. In this instance, a copy of the database files is typically loaded into RAM for each process. The more processes and the bigger are the database files, the more system memory is used. Accordingly, there is a need for an improved technique for updating malware databases and performing scan of computer systems for malware by an antivirus application.

SUMMARY

Disclosed are systems, methods and computer program products for optimizing system memory utilization during execution of an antivirus application. In one example embodiment, the antivirus application maintains an antivirus cache in a non-volatile memory of a computer system, e.g., hard drive. The antivirus application periodically checks if the antivirus cache requires updating and, if so, loads one or more updates from an antivirus database. Each update contains different types of data and executable code associated with different types of known malware. During update, the same types of data for each type of malware is collected and stored as data files in corresponding sections of the antivirus cache. The executable code from each loaded update are converted into a dynamic library, such as dynamically-linked library or dynamic shared objects (DSO) and stored in a corresponding section of the antivirus cache. During execution of the antivirus application, the system maps one or more data files of the antivirus cache into physical memory, so that these memory-mapped data files and the dynamic libraries of the antivirus cache may be shared and simultaneously accessed by several malware detection processes, thereby improving memory utilization on the computer system during execution of the antivirus application.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings.

DETAILED DESCRIPTION OF EXAMPLE EMBODIMENTS

Example embodiments are described herein in the context of systems, methods and computer program products for computer resource optimization during antivirus database updating and computer malware detection processes. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
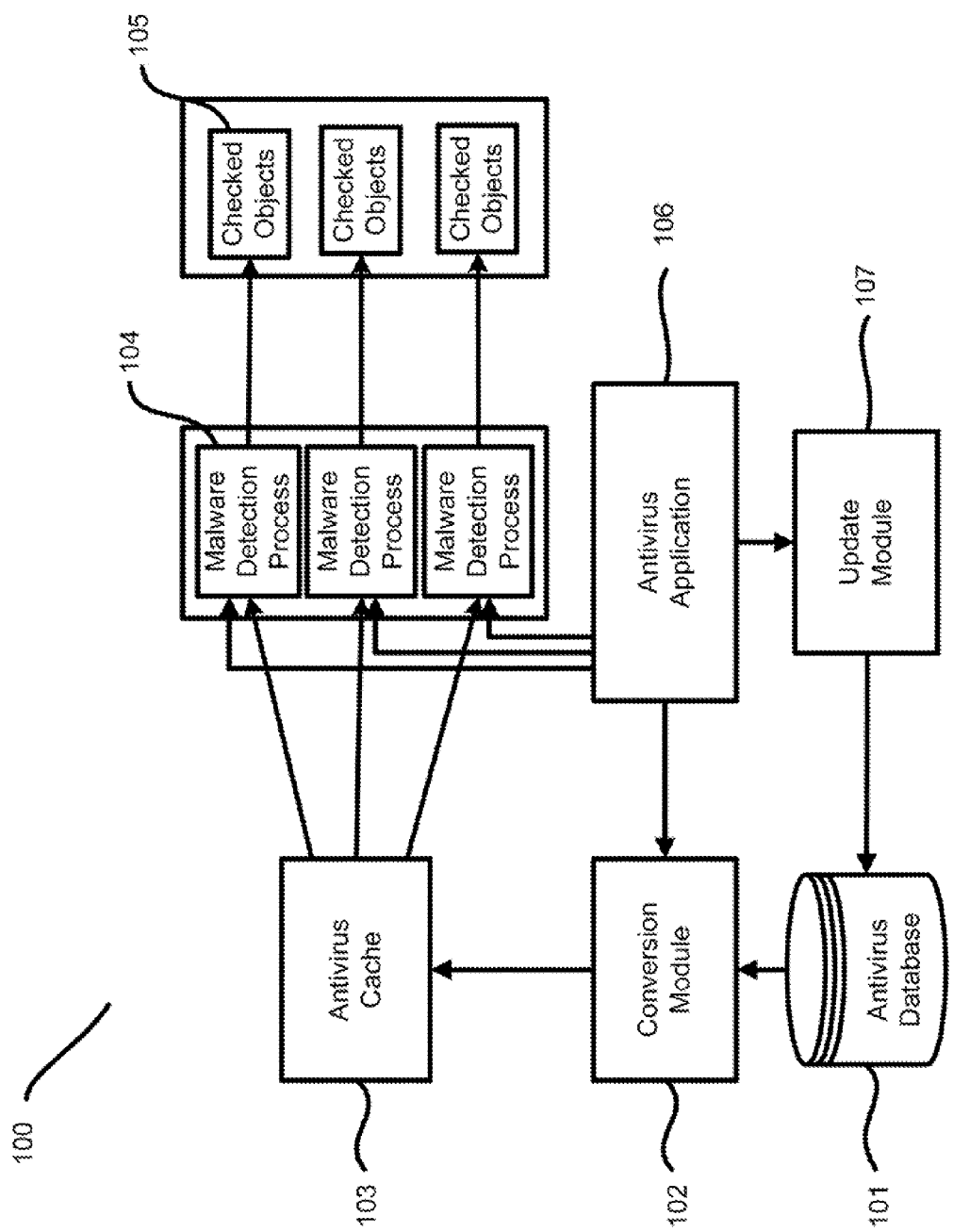
FIG. 1 illustrates a schematic block diagram of a system for computer malware detection in accordance with one example embodiment.

FIG. 1 depicts a diagram of the system for computer resource optimization during antivirus database updating and malware detection processes in accordance with one example embodiment. The system 100 comprises an antivirus database 101, which contains information about different types of computer malware, such as viruses, worms, Trojans, etc. For each type of malware the database 101 may store such information as the signatures of viruses and other threats, executable code for data decompression and heuristic analysis algorithms, pseudo code for data decompression and heuristic analysis algorithm (interpretable byte code), and other information for combating computer malware.

The system further includes an antivirus application 106, which controls scanning of computer objects 105, such as applications, programs, files, etc. for presence of malware, and launches the process of updating the antivirus database 101 and an antivirus cache 103. The antivirus application 106 may include an update module 107, which, when launched by the application, checks for the existence of updates to the antivirus database 101 and loads any necessary updates from a remote update server (not depicted). The antivirus application 106 may also includes a conversion module 102, which when launched by the application, creates or updates antivirus cache 103 from the data stored in the antivirus database 101.

The antivirus database 101 stores malware-related data in the same format as it was downloaded from the update server; namely, one or more data files containing all data and executable codes associated with a particular type of malware. However, information stored in the antivirus database is converted using conversion module 102 into antivirus cache 103 in a different format for use by the antivirus application 106, so that this data can be simultaneously accessed and shared by several malware detection processes 104 launched by the antivirus application 106 without duplicating this data in the RAM during runtime.

In one example embodiment, when the antivirus database is updated, the antivirus application 106 launches update module 107. The update module 107 checks for changes in the current version of the antivirus database 101 and loads missing or modified files if the result of the check is positive. The conversion module 102 converts the antivirus database 101 into antivirus cache 103. The conversion module 102 may be launched by the antivirus application 106 after each update of database 101 to convert database 101 into cache 103. The details of the process of creating the cache are described below with reference to FIG. 3.

After the antivirus cache 103 has been created or updated, it is stored in the computer's non-volatile memory (e.g., on the hard disk drive) and is used by one or more malware detection processes 104 executed by the antivirus application 106 for analysis of various data objects 105 for presence of malware. In one example embodiment, the antivirus cache 103 may be automatically updated the next time when antivirus database 101 is updated. When the antivirus application 106 is swapped out and reloaded, the data cache 103 may be reused without modification, which speeds up operation of the computer system 100.

Figure 2:
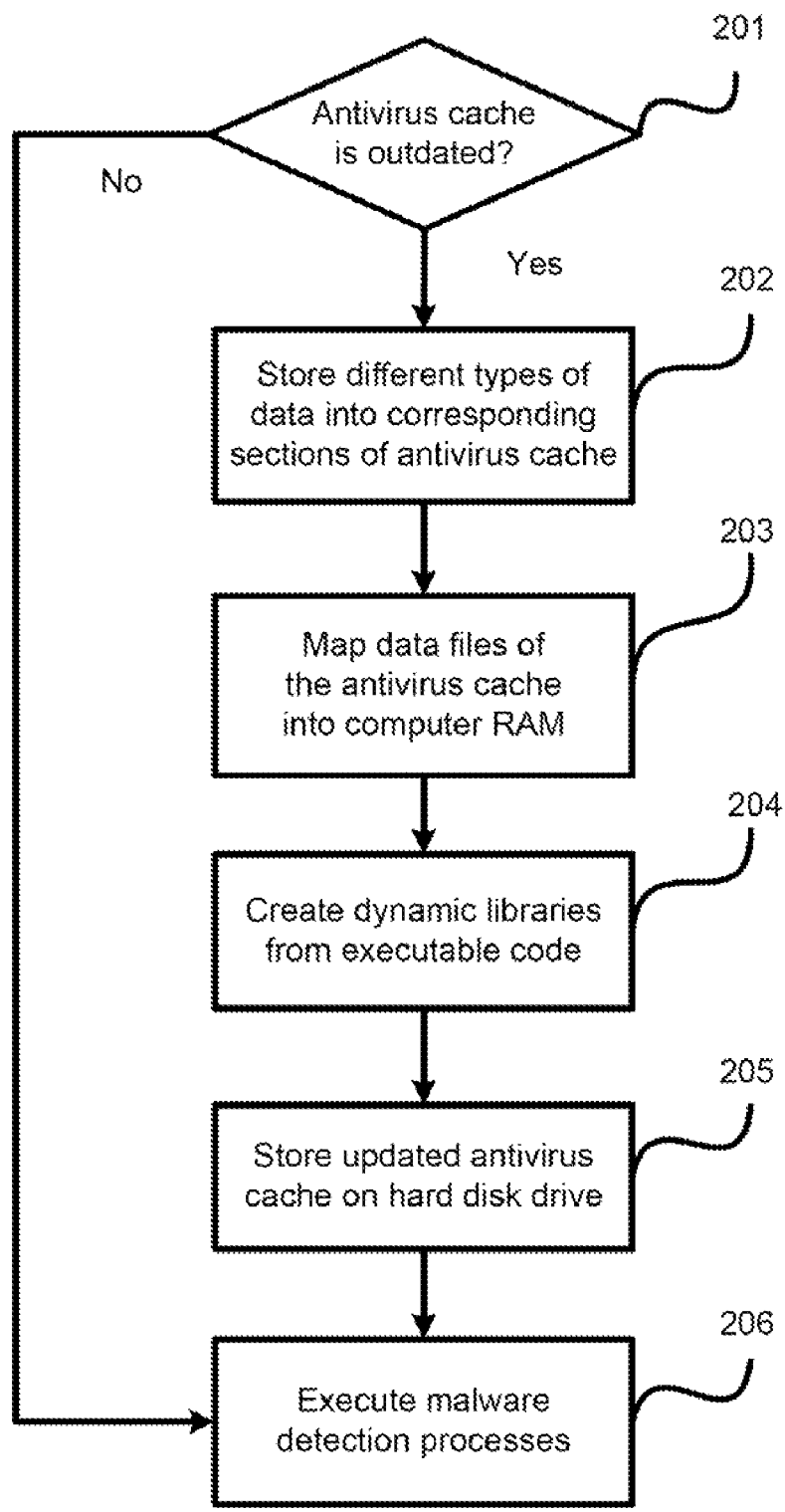
FIG. 2 illustrates a schematic flow diagram of a method for antivirus cache updating in accordance with one example embodiment.

FIG. 2 illustrates a process of antivirus cache creation/updating in accordance with one example embodiment. At step 201, the update module 107 determines if contents of the antivirus cache 103 match the contents of the antivirus database 101. It should be noted that contents of the antivirus cache 103 may differ from the contents of the antivirus database 101 in case when antivirus database 101 has been updated by the user or by the antivirus application 106 with information about new computer malware and threats. If contents of the antivirus cache 103 are outdated, then the updated content of antivirus database 101 will be used to update the antivirus cache 103 using the conversion module 102, as shown in steps 202-205. If the version of the antivirus cache 103 matches the current version of the antivirus database 101, the antivirus cache 103 is considered to be current and malware detection processes 104 may launched by the antivirus application 106 at step 206.

As indicated above, the updated antivirus database 101 consists of files that contain different types of data and executable code associated with different type of computer malware. The malware detection processes 104 however require that different types of data and different types of executable code are grouped separately; for example, all malware signatures for different types of malware are stored together and separately from the executable codes associated with the same type of malware. Therefore, when update files are loaded, the conversion module 102 retrieves and stores different types of updated data and different types of updated code into corresponding sections of the antivirus cache 103 at step 202, so that different sections of antivirus cache 103 contain different types of data and code.

In one example embodiment, each data-containing section of the antivirus cache 103 may be written to one or more data files, which can be memory-mapped at step 203 to the random-access memory of the computer system during execution of one or more malware detection processes 104. The preferred format of such data files allows them to be loaded at arbitrary address and used without subsequent modifications. This can be achieved, for example, by using file-relative offsets instead of pointers to link data structures. In one embodiment, every section is written to a separate memory-mapped file. In another embodiment, some sections can be written together to the single file. In another example embodiment, one or more code section of the antivirus cache 103 may be converted at step 204 by the conversion module 102 into platform-specific dynamic libraries, such as dynamically-linked libraries, dynamic shared objects (DSO) of the like. The updated antivirus cache 103 is stored on the hard drive or other non-volatile storage medium, at step 205. The memory-mapped data files and the dynamic libraries of the antivirus cache may be simultaneously accessed and shared by several malware detection processes at step 206.

Figure 3:
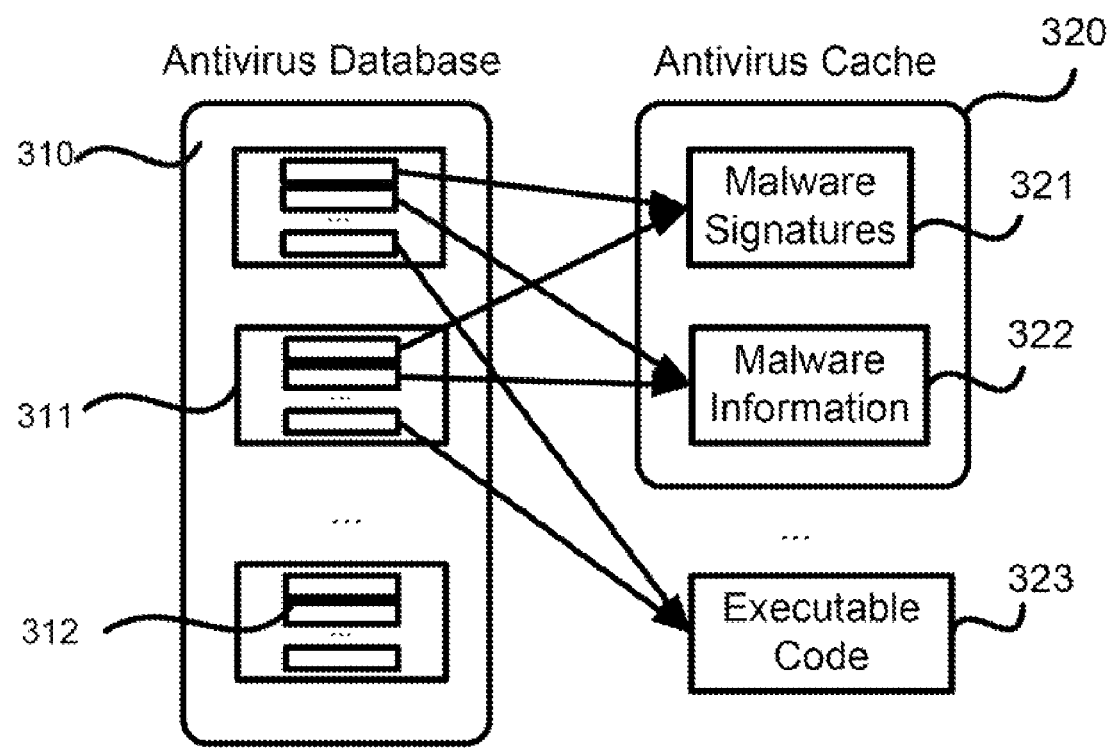
FIG. 3 illustrates a schematic block diagram of data conversion between the antivirus database and the antivirus cache in accordance with one example embodiment.

FIG. 3 illustrates data conversion processes between the antivirus database and the antivirus cache in accordance with one example embodiment. As described above, the antivirus cache 320 is generated froth the update files 311 of the current antivirus database 310. Each of the update files 311 may contain data of different types 312 (e.g., malware signatures, pseudo code, additional information about threats, etc). In the first stage of creation of the cache, the contents 312 of the files 311 in the database 310 are regrouped and stored as files in the antivirus cache 320. The regrouping is based on the principle of storing different type of data and executable code in different sections of the antivirus cache. Therefore, all malware signatures from files 311 are placed in data file(s) in section 321; information about threats is placed in data file(s) in section 322; executable code from files 311 is placed in code file(s) in section 323, and so on. Thus, multi-sectional antivirus cache 320 contains a plurality of files each containing similar type of information about malware.

In one example embodiment, data files in sections 321, 322 may be memory-mapped into the physical memory of the user computer system during execution of the antivirus application 106. One advantage of using memory-mapping is that malware detection processes 104 launched by the antivirus application 106 can access and use contents of the memory-mapped data files 321, 322 without the additional data format conversion during runtime and as if these files were loaded into the main memory of computer system 100, while the data files are actually located in antivirus cache on the hard drive. In addition, several malware detection processes 104 may simultaneously access and share memory-mapped data files from antivirus cache 320 without having to load separate instances of these files for each malware detection process 104. Consequently, use of memory-mapped data files in antivirus cache 103, significantly increases memory usage efficiency.

The memory-mapping mechanism described above, however, does not work as efficiently with the executable code sections 323 of the antivirus cache 320 as it works with data files 321, 323. For example, after the executable code is loaded into main memory, the relocation process is carried out: executable code must be modified according the actual address to which it is loaded. The parts of the code containing absolute addresses are modified. As a result of mapping a section of executable code to different malware detection processes, the address map may be different for each process, and the code for each process must be relocated separately. In this way shared uses of a section of code is impossible, since it must be modified individually for each malware detection process that uses it.

Another drawback of loading executable code into the main memory is the presence of constraints imposed by the operating system of the computer system on the execution of that code. For example, some versions of Windows® OS allow usage of Structured Exception Handling (SEH) only in code loaded in the form of a dynamically-linked library that contains a special data structure containing a list of safe SEH procedures.

To eliminate these drawbacks, the executable code sections 323 of the antivirus cache 320 may be converted to the dynamic library format defined by the target operating system, as shown in FIG. 3, in accordance with one example embodiment. The dynamic library 323 that contains executable code of the antivirus cache 320 may include a dynamically-linked library (DLL), dynamic shared object (DSO) or other platform-specific format of shared library file. The tool that performs the code conversion to a dynamic library uses standard dynamic library formats, same as those generated using the standard tools within the particular operating system platform. Description of such formats and tools can be found within the Tool Interface Standards, Portable Format Specification Version 1.0, TIS Committee, February 1993 and other standard documents for specified platforms.

In one example embodiment, dynamic libraries 323 that contain executable code may be loaded in to the RAM of the computer system 100 by the antivirus application 106 for use by the one or more malware detection processes 104. When loaded into computer's main memory a single copy of the dynamic library 323 may be simultaneously accessed and shared by several malware detection processes 104, which increases memory usage efficiency. For example, in Windows® OS, a library is loaded according to the address selected by the system, so that it is mapped to various processes without individual relocations. In the UNIX family of operating systems, this task is accomplished using PIC (position-independent code). Thus, problem of the sharing of the executable code section by different processes is solved.

Figure 4:
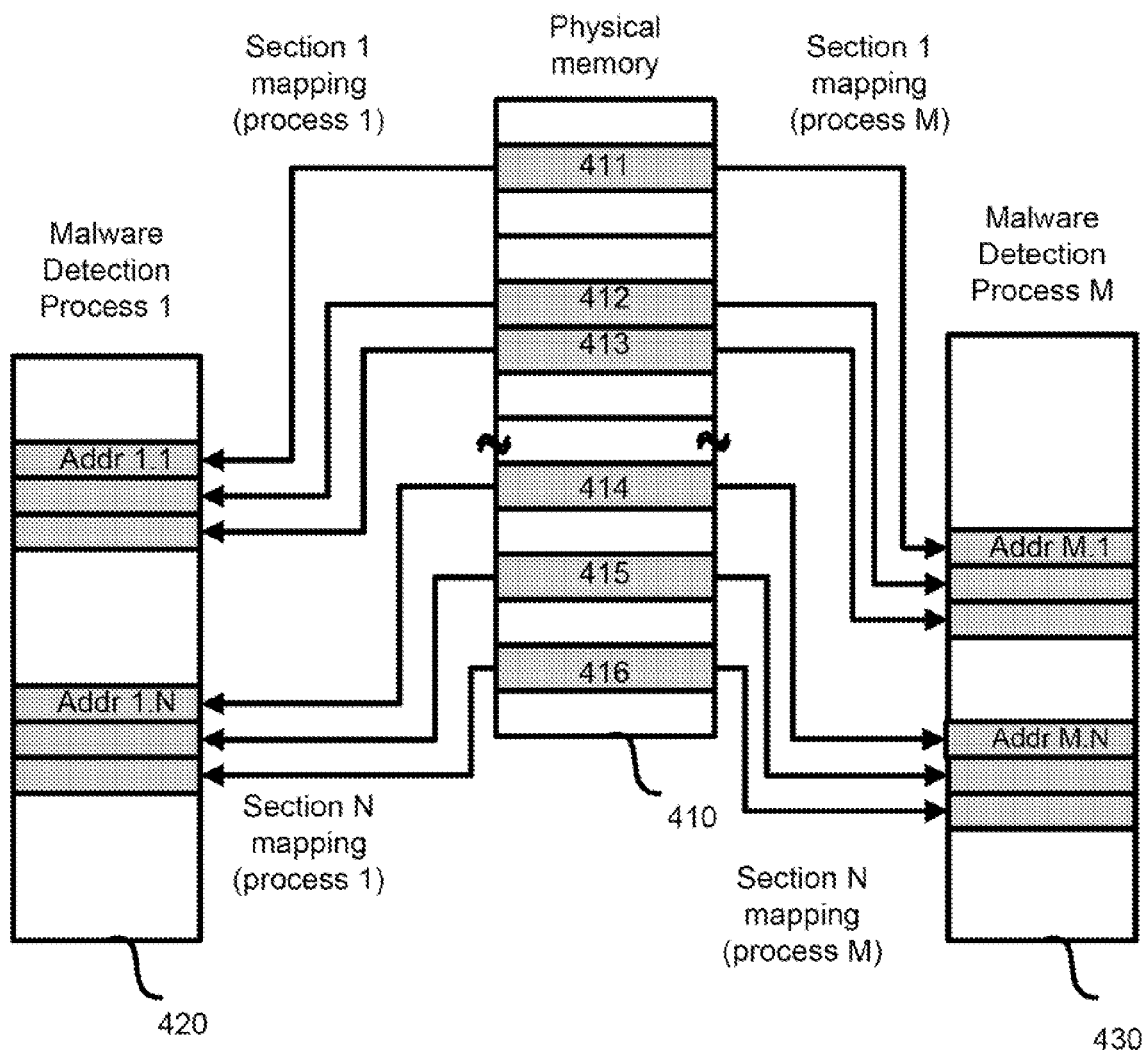
FIG. 4 illustrates a schematic block diagram of antivirus cache sharing by several malware detection processes in accordance with one example embodiment.

FIG. 4 shows a diagram of antivirus cache sharing by several malware detection processes in accordance with one example embodiment. During an antivirus check the antivirus application 106 may launch 1-M malware detection processes 104 and monitor their execution. The processes 104 may execute in parallel or in series. Each process 104 loads codes or scripts for checking certain objects 105 of the computers system 100, such as e-mail content and attachments, network traffic, downloaded files, secondary storage devices, etc., for presence of malware, such as viruses, worms, Trojans, spam, etc., using contents of antivirus cache 320, which are used for detection of various types of malware.

The antivirus application 106 also maps the data files 321, 322 from antivirus cache 320 into the corresponding sections 1-N of physical memory 410 of computer system IOU. The antivirus application 106 also loads the dynamic libraries 323 of the antivirus cache 320 into the corresponding section 1-N of the physical memory 410. In this manner, the memory-mapped data files 321, 322 and dynamic libraries 323 may be simultaneously accessed and shared by 1-M malware detection processes 104, as shown in FIG. 4. For each process the content of memory mapped files containing antivirus cache sections is visible as contiguous areas of virtual memory 420, 430. Since the format of antivirus cache sections is address-independent, it does not require further modification by individual processes, all processes can use the same physical memory pages 411-416 containing antivirus cache data.

In one example embodiment, one or more data-containing sections of the antivirus cache 103 may be placed in a common dynamic library in the form of read-only data. In this case, the dynamic library must be regenerated when the data contained therein are updated. The conversion module 102, which generates the antivirus cache 103 from the antivirus database 101, may also be configured to automatically update antivirus cache 103 when updates to the antivirus database 101 are loaded by the update module 107, in which case one or more memory-mapped data files and dynamic libraries are updated or regenerated.

Figure 5:
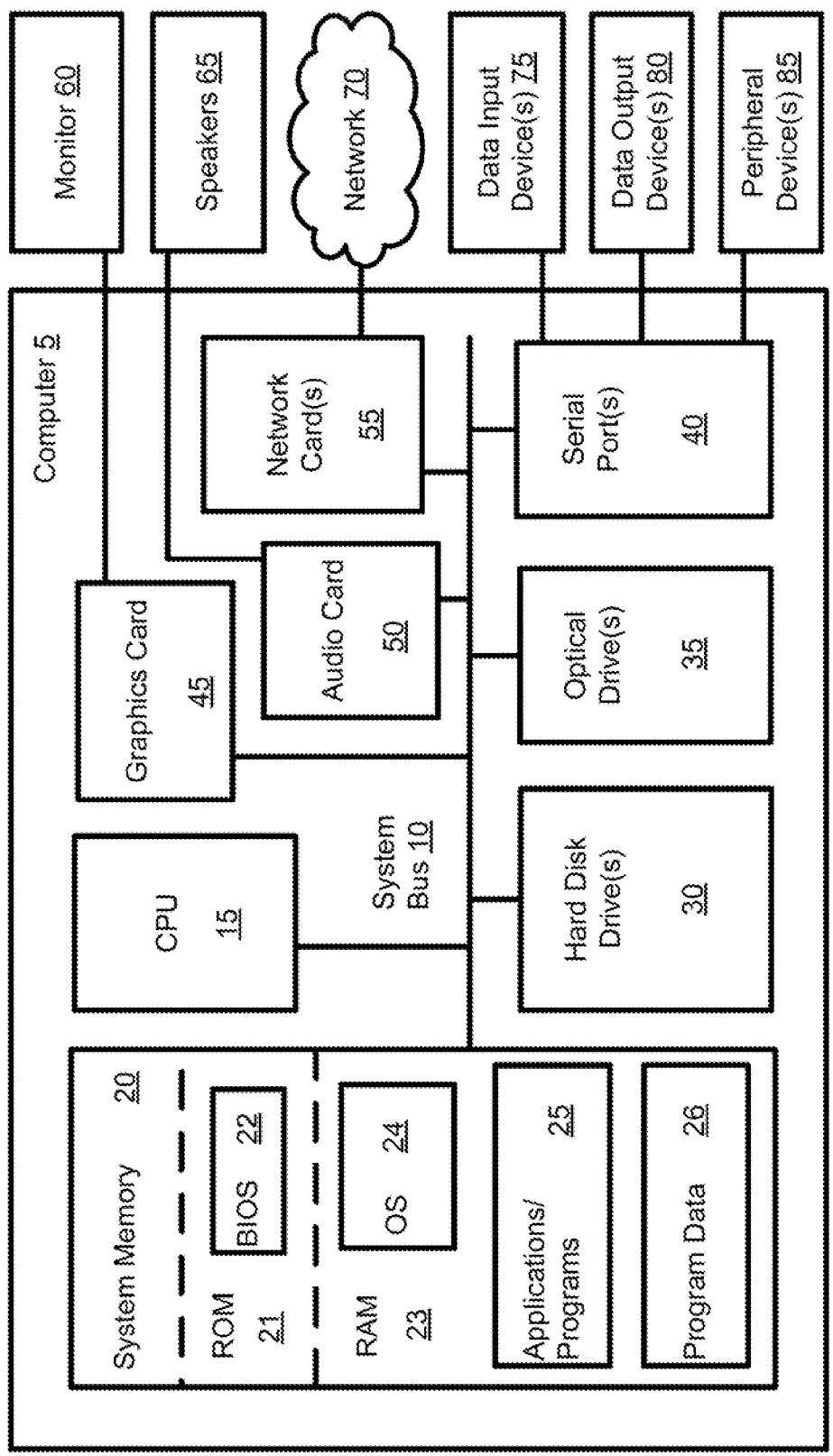
FIG. 5 illustrates a schematic block diagram of a computer system in accordance with one example embodiment.

FIG. 5 depicts an exemplary computer system 5, which can be used to implement computer 105, in accordance with one example embodiment. It should be noted that computer system 5 may also be used to implement a desktop computer, a workstation, a laptop computer, an application server or other type of data processing device. As depicted, computer system 5 includes CPU 15, system memory 20, hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include Intel® Core 2 Quad 2.33 GHz processor or other type of microprocessor.

System memory 20 includes a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® Vista®, UNIX® OS or other type of operating system, that is responsible for management and coordination of processes and allocation and sharing of hardware resources in computer system 5. System memory 20 also stores applications and programs 25 that are currently running on the computer 5, including an antivirus application 106 and various other programs. System memory 20 also stores various runtime data 26 used by the applications and programs 25.

Computer system 5 may further include hard disk drive(s) 30, such as 500 GB SATA magnetic hard drive, and optical disk drive(s) 35 for reading from or writing to a removable optical disk, such as a CD-ROM, DVD-ROM or other optical media. Drives 30 and 25 and their associated computer-readable media provide non-volatile storage of computer readable instructions, data structures, applications and program Modules/subroutines that implement algorithms and methods disclosed herein. Although the exemplary computer system 5 employs magnetic and optical disks, it should be appreciated by those skilled in the art that other types of computer readable media that can store data accessible by a computer 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. Computer system 5 may also include graphics card 45, such as nVidia® GeForce® GT 240M or other video card, for interfacing with a monitor 60 or other video reproduction device. Computer system 5 may also include an audio card 50 for reproducing sound via internal or external speakers 65. In addition, computer system 5 may include network card(s) 55, such as Ethernet, WiFi, GSM, Bluetooth or other wired, wireless, or cellular network interface for connecting computer system 5 to network 70, such as the Internet.

As used in this application, the terms "system," "component" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various non-transitory computer-readable medium having various data structures stored thereon. The components may communicate by way of local and/or remote processes such as in accordance with a signal having one or more data packets, such as data from one component interacting with another component in a local system and/or across a network, such as the Internet with other systems.

In various embodiments, the algorithms and methods described herein may be implemented in hardware, software, firmware, or any combination thereof. If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for detection of computer malware, the method comprises:
   determining if an antivirus cache in a non-volatile memory of a computer system requires updating, wherein the antivirus cache includes a plurality of sections containing different types of data and code associated with different types of computer malware;

loading one or more updates for the antivirus cache, wherein each update contains at least different types of data and executable code associated with a computer malware;

storing the same types of data from each loaded update as a data file in a corresponding section of the antivirus cache;

converting executable code from each loaded update into a platform-specific dynamic library and storing the dynamic library in a corresponding section of the antivirus cache;

mapping at least a portion of at least one data file in the antivirus cache of the non-volatile memory into a random-access memory of the computer system; and executing one or more malware detection processes on the computer system, wherein the memory-mapped data files and the dynamic libraries of the antivirus cache are shared among the one or more malware detection processes.

2. The method of claim 1, wherein determining if an antivirus cache of a computer system requires updating further comprises:

comparing contents of the antivirus cache with contents of an antivirus database; and if the contents of the antivirus cache differ from the contents of the antivirus database, updating antivirus cache from the antivirus database.

3. The method of claim 1, wherein the one or more memory-mapped data files and the dynamic libraries are simultaneously accessible by one or more malware detection processes.

4. The method of claim 1 further comprising converting one or more data files of the antivirus cache into a platform-specific dynamic library.

5. The method of claim 1, wherein the data includes malware signatures, information about malware, and a pseudocode for data decompression and heuristic analysis algorithms.

6. The method of claim 1, wherein the executable code includes at least an executable code for data decompression algorithms and an executable code for heuristic analysis algorithms.

7. A system for detection of computer malware, the system comprises:

a non-volatile memory for storing an antivirus cache comprising a plurality of sections for containing different types of data and executable code associated with different types of malware;

a processor coupled to the non-volatile memory, the processor being configured to:

determine if the antivirus cache requires updating;

load one or more updates for the antivirus cache, wherein each update contains at least different types of data and executable code associated with a computer malware;

store the same types of data from each loaded update as a data file in a corresponding section of the antivirus cache;

convert executable code from each loaded update into a platform-specific dynamic library and store the dynamic library in a corresponding section of the antivirus cache;

map at least a portion of at least one data file in the antivirus cache of the non-volatile memory into a random-access memory of the system; and execute one or more malware detection processes, wherein the memory-mapped data files and the dynamic libraries of the antivirus cache are shared among the one or more malware detection processes.

8. The system of claim 7, wherein to determine if an antivirus cache requires updating the processor being further configured to:

compare contents of the antivirus cache with contents of an antivirus database; and if the contents of the antivirus cache differ from the contents of the antivirus database, updating antivirus cache from the antivirus database.

9. The system of claim 7, wherein the one or more memory-mapped data files and the dynamic libraries are simultaneously accessible by one or more malware detection processes.

10. The system of claim 7, wherein the processor being further configured to convert one or more data files of the antivirus cache into a platform-specific dynamic library.

11. The system of claim 7, wherein the data includes malware signatures, information about malware, and a pseudocode for data decompression and heuristic analysis algorithms.

12. The system of claim 7, wherein the executable code includes at least an executable code for data decompression algorithms and an executable code for heuristic analysis algorithms.

13. A computer program product embedded in a non-transitory computer-readable storage medium, the computer-readable storage medium comprises computer-executable instructions for detection of computer malware, the medium comprises:

instructions for determining if an antivirus cache in a non-volatile memory of a computer system requires updating, wherein the antivirus cache includes a plurality of sections containing different types of data and code associated with different types of computer malware;

instructions for loading one or more updates for the antivirus cache, wherein each update contains at least different types of data and code associated with a computer malware;

instructions for storing the same types of data from each loaded update as a data file in a corresponding section of the antivirus cache;

instructions for converting executable code from each loaded update into a platform-specific dynamic library and storing the library in a corresponding section of the antivirus cache;

instructions for mapping at least a portion of at least one data file in the antivirus cache of the non-volatile memory into a random-access memory of the computer system; and instructions for executing one or more malware detection processes on the computer system, wherein the memory-mapped data files and the dynamic libraries of the antivirus cache are shared among the one or more malware detection processes.

14. The medium of claim 13, wherein instructions for determining if an antivirus cache of a computer system requires updating further comprises:

instructions for comparing contents of the antivirus cache with contents of an antivirus database; and if the contents of the antivirus cache differ from the contents of the antivirus database, instructions for updating antivirus cache from the antivirus database.

15. The medium of claim 13, wherein the one or more memory-mapped data files and the dynamic libraries are simultaneously accessible by one or more malware detection processes.

16. The medium of claim 13 further comprising converting one or more data files of the antivirus cache into a platform-specific dynamic library.

17. The medium of claim 13, wherein the data includes malware signatures, information about malware, and a pseudocode for data decompression and heuristic analysis algorithms.

18. The medium of claim 13, wherein the executable code includes at least an executable code for data decompression algorithms and an executable code for heuristic analysis algorithms.

* * * * *